United States Patent
Cheng et al.

(10) Patent No.: US 7,837,201 B2
(45) Date of Patent: Nov. 23, 2010

(54) ASSISTANT APPARATUS FOR SURMOUNTING BARRIER

(75) Inventors: Pi-Ying Cheng, Hsinchu (TW); Kian-Poh Wong, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 104 days.

(21) Appl. No.: 12/371,038

(22) Filed: Feb. 13, 2009

(65) Prior Publication Data

US 2010/0096816 A1    Apr. 22, 2010

(30) Foreign Application Priority Data

Oct. 16, 2008    (TW) .............. 97139657 A

(51) Int. Cl.
*B62B 5/02* (2006.01)
*B62B 9/02* (2006.01)

(52) U.S. Cl. ............. 280/5.2; 280/5.24; 280/5.3; 280/5.32; 180/8.1; 180/8.2; 180/8.3; 180/8.5; 180/8.6

(58) Field of Classification Search ......... 280/5.2, 280/5.24, 5.3, 5.32; 180/8.1, 8.2, 8.3, 8.5, 180/8.6

See application file for complete search history.

(56) References Cited

U.S. PATENT DOCUMENTS

| | | | |
|---|---|---|---|
| 6,752,400 B2 * | 6/2004 | Nakatsukasa et al. | 280/5.2 |
| 7,380,618 B2 * | 6/2008 | Gunderson et al. | 180/8.2 |
| 7,503,567 B2 * | 3/2009 | Frankie | 280/5.2 |
| 2006/0038360 A1 * | 2/2006 | Negishi | 280/5.2 |
| 2006/0255581 A1 * | 11/2006 | Goertzen et al. | 280/755 |
| 2007/0045012 A1 * | 3/2007 | Brehob et al. | 180/8.2 |
| 2008/0251300 A1 * | 10/2008 | Frankie | 180/8.2 |
| 2009/0194955 A1 * | 8/2009 | Kakinuma et al. | 280/5.2 |

FOREIGN PATENT DOCUMENTS

| TW | 290857 | 11/1996 |
|---|---|---|
| TW | 301605 | 4/1997 |
| TW | 427159 | 3/2001 |
| TW | 200631563 | 9/2006 |
| TW | 20074399 | 2/2007 |

OTHER PUBLICATIONS

Kian-Poh Wong, Study and Application of the Wheel Robot Design on the Step-Climbing Wheelchair, Master Thesis issued on the website :"http://etds.ncl.edu.tw/theabs/site/sh/detail_result.jsp", Jun. 30, 2008, Taiwan.

* cited by examiner

*Primary Examiner*—Lesley Morris
*Assistant Examiner*—Marlon A Arce
(74) *Attorney, Agent, or Firm*—WPAT, PC; Justin King

(57) ABSTRACT

The present invention provides an assistant apparatus for surmounting a barrier, which comprises a carrier body, an assistant mechanism, and a sensing/driving apparatus. The assistant mechanism, disposed at a side of the carrier body, having an assistant block disposed at the end thereof, functions to place the assistant block on the ground between the carrier body and the barrier so that the carrier body is capable of surmounting the barrier through the assistance of the assistant block. The sensing/driving apparatus, coupled to the assistant mechanism, functions to drive the assistant mechanism to generate the adjusting movement according to whether the barrier is detected or not. By means of the design of the present invention, the assistant block is adopted to reduce the height surmounted by the carrier each time so that the carrier is capable of surmounting the barrier section by section.

14 Claims, 20 Drawing Sheets

ASSISTANT APPARATUS FOR SURMOUNTING BARRIER

FIELD OF THE INVENTION

The present invention relates to a technique for surmounting a barrier, and more particularly, to an assistant apparatus for surmounting a barrier capable of dividing the height of the barrier into sections for enabling a carrier to surmount the barrier in a step-by-step manner and thus facilitating the carrier to surmount the barrier.

BACKGROUND OF THE INVENTION

Carriers used by old age or handicapped people for helping them regain their mobility, such as wheelchairs, can usually be divided into two categories, which are manual or self-propelled wheelchairs and electric-powered wheelchairs. Nevertheless, both the manual and electric-powered wheelchairs are often varied on their basic design for accustoming to different usages and environments. One most common design seen in prior-art is the wheelchair incorporating stair-climbing structure, or, in another word, a carrier with barrier surmounting ability. Thus, there are more and more manufacturers trying to design a carrier with better barrier surmounting ability as it is the device that will be highly valued in the years to come. However, there are still not so many carriers with barrier surmounting ability seen on the market, since most such prior-art devices are bulky, complicated, expensive, may have a risk of tipping over, and may require a huge motor for providing a large torque to surmount a barrier, and so on.

There are already many prior-art carriers designed with barrier surmounting structure. However, such structures usually are components configured in drive wheels and guide wheels of the carrier or even in the frame of the carrier, to be used for climbing a stair or surmounting a barrier. One such barrier-surmounting structure is disclosed in TW Pat. 301605, which is an improvement on the drive wheels and guide wheels of a carrier for surmounting barriers. The barrier surmounting of the aforesaid carrier is enabled by a rim block disposed inside a sub-panel region defined by the sub-panels arranged on the circumference of the carrier's wheels, since when the carrier is block by a barrier, the rim block will abut against the extrusion of a barrier by its top side so that it can assist the carrier to be raised for surmounting the barrier. Another prior-art barrier-surmounting structure is disclosed in TW Pub. No. 200631563, which uses a linkage mechanism to bring the drive wheel or the guide wheel of a carrier to move for surmounting a barrier. In a wheelchair disclosed in the aforesaid patent application, the drive wheels are driven by the linkage mechanism in a manner that the each driven wheel will exert a larger normal force to the ground and thus increase friction to the ground that are used for surmounting the barrier. It is noted that the carrier adopting the aforesaid technique can surmount barrier as high as 60 mm without difficulty since the design of the linkage mechanism also takes the change of the carrier's gravity center into consideration when it is surmounting the barrier.

Furthermore, there is a fan-shaped hill climber disclosed in TW Pat. No 290857 and TW Pat. No. 427159, which is a carrier capable of raising its guide wheels by the pushing of its drive wheels and thereby surmounting a barrier. In this hill climber, as it uses a single rod to contact with the barrier and thus form a single pivot for raising the carrier to surmount the barrier, the carrier may in a constant risk of tipping over during the surmounting. Moreover, in TW Pub. No. 200704399, the barrier surmounting is achieved by the two rollers arranged in front of the carrier's guide wheels, that is, when the carrier is blocked by a stair, the two rollers will be the first in contact with the barrier and then, as the carrier is driving to move forward by the drive wheels, the forward pushing force will force the two rollers will raise the carrier so that the height difference between the guide wheel and the barrier is reduced for facilitating the surmounting of the barrier. It is noted that there is another prior-art barrier-surmounting structure is disclosed in TW No. 502732, which is similar to that disclosed in TW Pub. No. 200704399.

SUMMARY OF THE INVENTION

The object of the present invention is to provide an assistant apparatus for surmounting a barrier, capable of using the placing of stepping blocks to divide the height of the barrier into sections for enabling a carrier to surmount the barrier in a step-by-step manner and thus facilitating the carrier to surmount the barrier by the use of a comparatively less torque generated by a driving device of smaller horse power as the height of the barrier is sectioned by the stepping blocks and thus the height difference between the carrier and each step required for the carrier to surmount is reduced comparing with the original height difference between the barrier and the carrier. It is noted that the present invention is adapted for assisting a carrier to surmount a barrier of multiple level differences regulated by the Statistical Analysis Durable Medical Equipment Regional Carrier (SADMERC) in a stable, comfort and safe manner.

In an exemplary embodiment, the present invention provides an assistant apparatus for surmounting a barrier, comprising: a carrier body; an assistant mechanism, having an assistant block disposed at the end thereof while being disposed on the carrier body, capable of functioning to place the assistant block at a position between the carrier body and the barrier by the performing of an adjustment movement; and a sensing/driving apparatus, coupled to the assistant mechanism for detecting the status of the barrier so as to use the detection as basis for determining whether or not to activate the assistant mechanism to perform the adjustment movement.

In another exemplary embodiment, the aforesaid carrier body further comprises a drive wheel. Moreover, the assistant mechanism further comprises: a driving gear, coupled to a wheel axle of the drive wheel; a rotation arm, being configured with at least a groove and a sliding trough with a sliding block slidably fitted therein, disposed at a side of the driving gear while enabling a surface of the rotation arm facing toward the driving gear to be configured with a toothed portion capable meshed with the driving gear; an elastic element, disposed at a position between the rotation arm and the driving gear; and at least a rod, each pivotally coupled to the sliding block while enabling an end thereof to be pivotally coupled to the assistant block. In addition, the sensing/driving apparatus further comprises: a driving entity, being configured with at least a protrusion at positions corresponding to the at least one groove of the rotation arm as it is being disposed at a side of the rotation arm while being pivotally coupled to a fixing shaft; and a sensing element, being connected to the driving entity by a plurality of inter-connected transmission rods; wherein when the sensing element detects the barrier, the detection will force the plural transmission rods to bring along the driving entity to rotate, and the rotation will detaching the at least one protrusion from the at least one groove while enabling the same to abut against the rotation arm and thus controlling the rotation arm to perform an axial movement so as to mash the toothed portion to the driving gear and thus cause the rotation arm to be driven to rotate for placing the assistant block at a position between the barrier and the drive wheel.

In further another exemplary embodiment, the aforesaid carrier body further comprises a drive wheel. Moreover, the assistant mechanism further comprises: a driving gear, coupled to a wheel axle of the drive wheel; a rotation arm, being configured with at least a groove and a sliding trough with a sliding block slidably fitted therein, disposed at a side of the driving gear while enabling a surface of the rotation arm facing toward the driving gear to be configured with a toothed portion capable meshed with the driving gear; an elastic element, disposed at a position between the rotation arm and the driving gear; and at least a rod, each pivotally coupled to the sliding block while enabling an end thereof to be pivotally coupled to the assistant block. In addition, the sensing/driving apparatus further comprises: a sensor, for detecting the barrier; a driving entity, being configured with at least a protrusion at positions corresponding to the at least one groove of the rotation arm as it is being disposed at a side of the rotation arm while being pivotally coupled to a fixing shaft; a controller, electrically connected to the sensor for enabling the same to generate a control signal basing upon the detection of the sensor; and a rotation driving unit, coupled to the driving entity while electrically connecting to the controller; wherein, the rotation driving unit is able to bring along the driving entity to rotate according to the control signal, by that the at least one protrusion is detached from the at least one groove while enabling the same to abut against the rotation arm, and thus controls the rotation arm to perform an axial movement for mashing the toothed portion to the driving gear and thus causing the rotation arm to be driven to rotate for placing the assistant block at a position between the barrier and the drive wheel.

In yet another exemplary embodiment, the assistant mechanism further comprises: a rotation arm, having a sliding trough with a sliding block slidably fitted therein; and at least a rod, pivotally coupled to the sliding block while having an end thereof coupled to the assistant block. Moreover, the sensing/driving apparatus further comprises: a sensor, for detecting the barrier; a controller, electrically connected to the sensor for enabling the same to generate a control signal basing upon the detection of the sensor; and a rotation driving unit, coupled to a driving entity while electrically connecting to the controller; wherein, the rotation driving unit is able to bring along the rotation arm to rotate according to the control signal, by that the assistant block is placed at a position between the barrier and the drive wheel.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
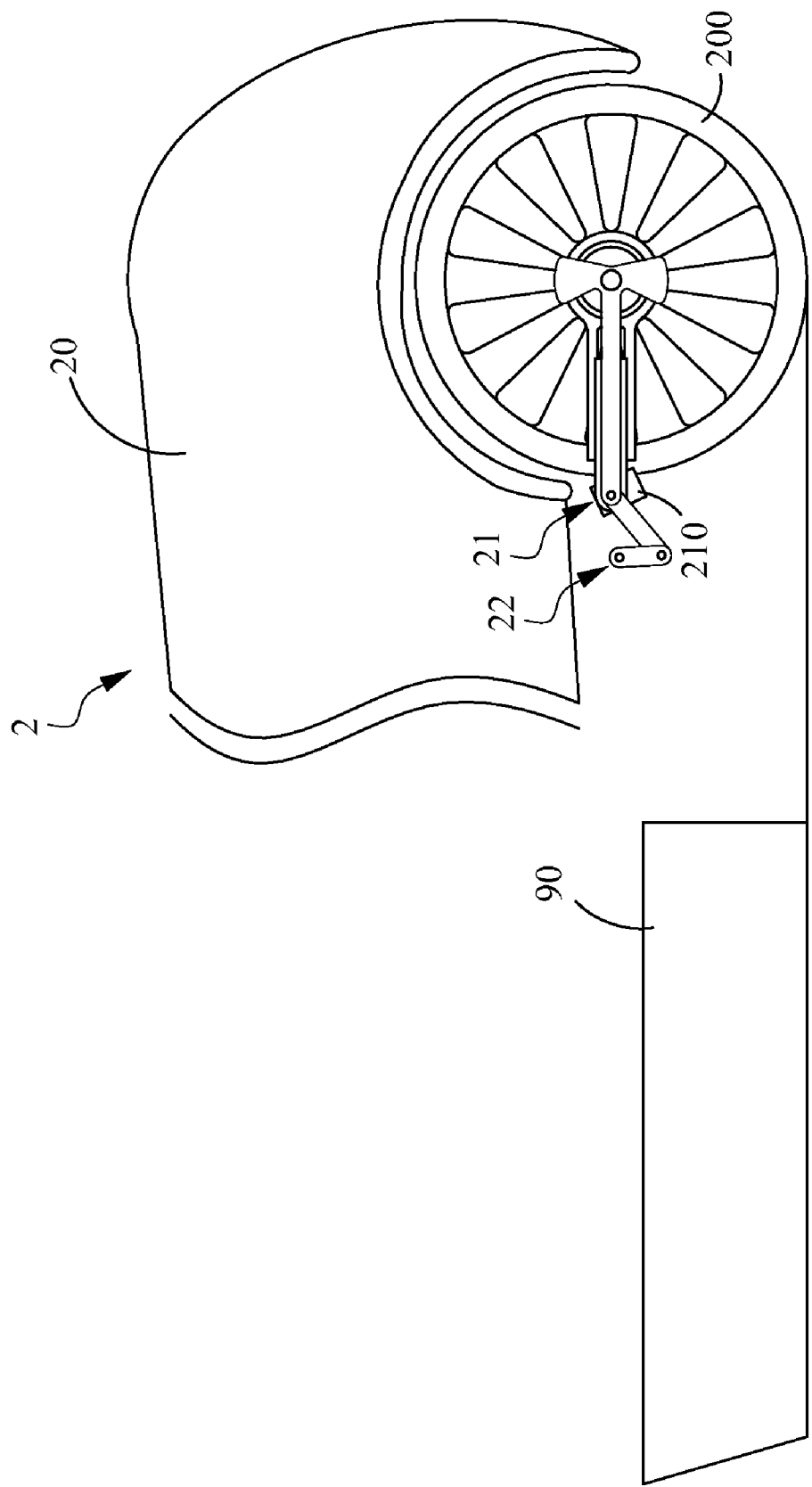
FIG. 1 is a schematic diagram showing an assistant apparatus for surmounting a barrier according to an embodiment of the invention.

Please refer to FIG. 1, which is a schematic diagram showing an assistant apparatus for surmounting a barrier according to an embodiment of the invention. In this embodiment, the assistant apparatus for surmounting a barrier 2 has a carrier body 20 that can be configured with at least a drive wheel 200, it is noted that the carrier body can be a vehicle body, but is not limited thereby. In addition, there are an assistant mechanism 21 and a sensing/driving apparatus 22 mounted on the vehicle body 20. The assistant mechanism 21, having an assistant block 210 disposed at the end thereof, is capable of functioning to place the assistant block 210 at a position between the carrier body 20 and a barrier 90 by the performing of an adjustment movement. The sensing/driving apparatus 22 is used for detecting the existence of the barrier 91 so as to use the detection as basis for determining whether or not to activate the assistant mechanism 21 to perform the adjustment movement. As shown in FIG. 1, the characteristic of the present invention is that: the assistant apparatus 2, being capable of using the assistant mechanism 21 to place the assistant block 210 between the carrier body 20 and the barrier 91, will use the assistant block 210 as stepping stone for assisting the carrier body 20 to surmount the barrier 91, that is, as the height of the barrier 91 is sectioned by the assistant block 210 and thus the height difference between the carrier body 20 and each step required for the carrier body 20 to surmount is reduced comparing with the original height difference between the barrier 90 and the carrier body 20, it is ease for the carrier body 20 to surmount the barrier 91 by first stepping on the assistant block 210 and then on the barrier 91.

Figure 2:
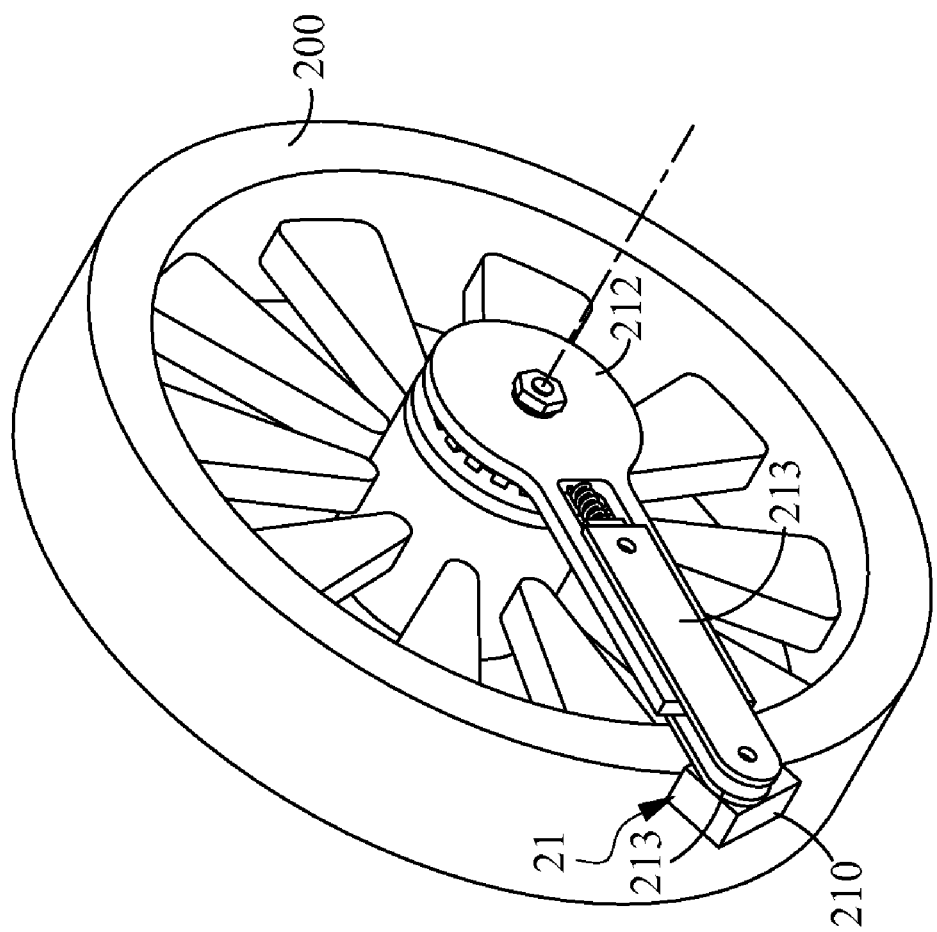
FIG. 2 is a three-dimensional diagram showing how the assistant mechanism is integrated with the drive wheel of an assistant apparatus for surmounting a barrier according to an embodiment of the invention.
Figure 3:
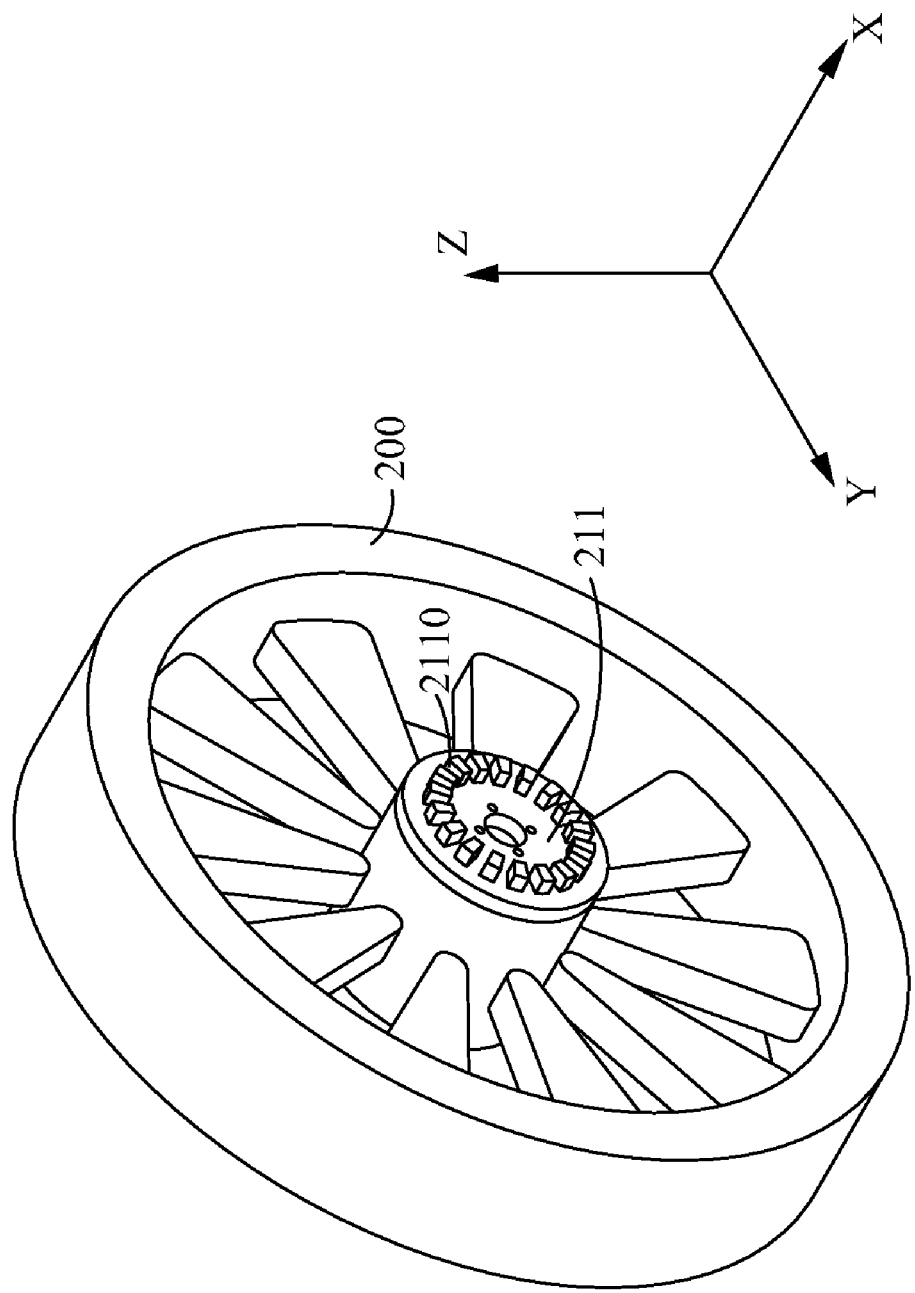
FIG. 3 is a schematic diagram depicting the connection relationship between the driving gear and the drive wheel of an assistant apparatus for surmounting a barrier according to an embodiment of the invention.
Figure 4A:
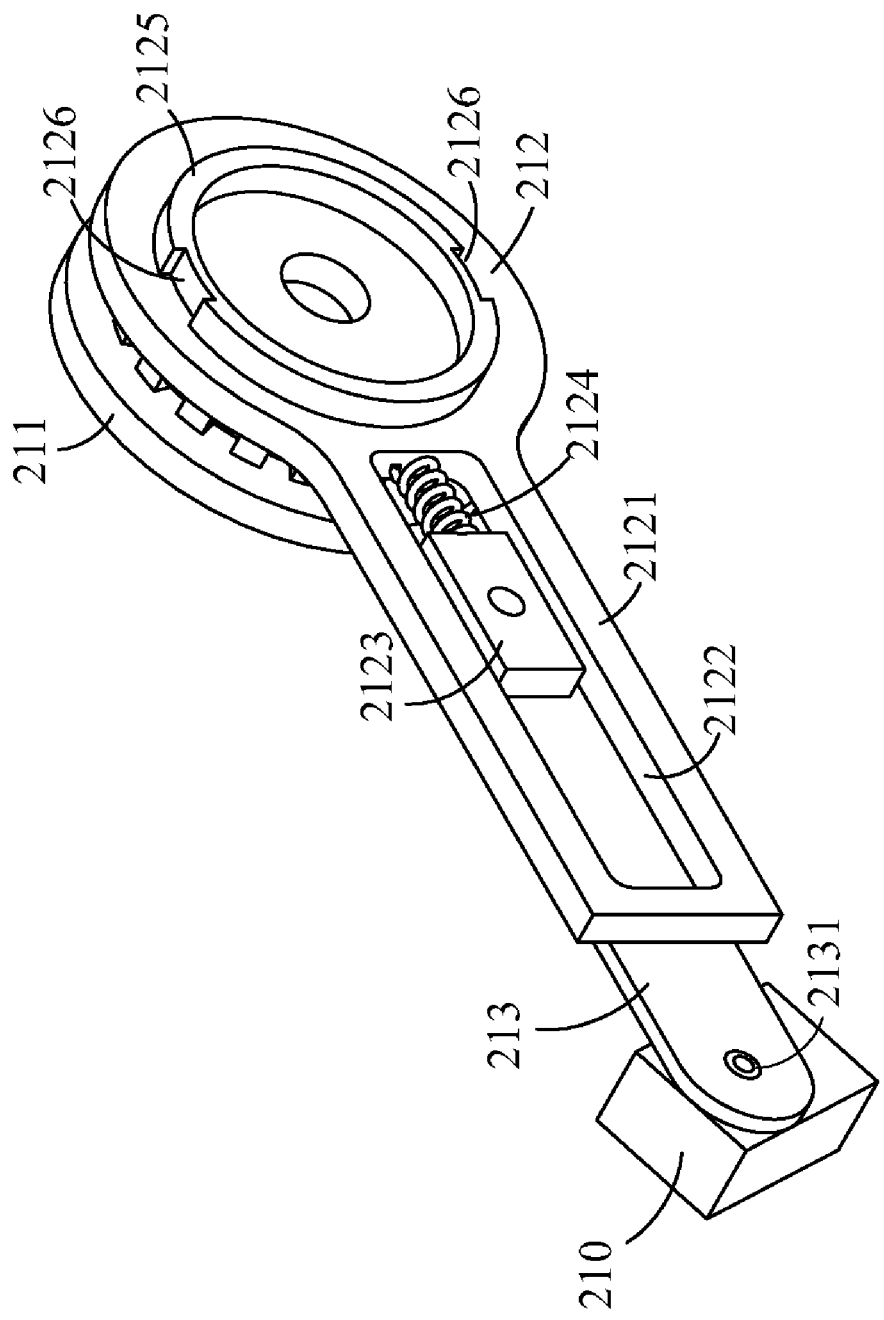
FIG. 4A to FIG. 4C shows a rotation arm used in an assistant apparatus of the invention.

Please refer to FIG. 2, which is a three-dimensional diagram showing how the assistant mechanism is integrated with the drive wheel of an assistant apparatus for surmounting a barrier according to an embodiment of the invention. In this embodiment, the assistant mechanism 21 is comprised of: a driving gear 211, a rotation arm 212 and at least a rod 213. As shown in FIG. 3, the driving gear 211, being coupled to a side of the wheel axle of the drive wheel 200 by a side thereof, is configured with a plurality of laterally extruded teeth 2110 at a side of the driving gear 211 that is not coupled to the drive wheel 200. In FIG. 3, the axes of the plural laterally extruded teeth 2110 are extending parallel to the X-axis of Cartesian coordinate system defined in FIG. 3. The rotation arm 212 is disposed at a side of the driving gear 211 while being arranged coaxial with the driving gear 211, as shown in FIG. 2. Please refer to FIG. 4A and FIG. 4B, which shows a rotation arm used in an assistant apparatus of the invention. In this embodiment, the rotation arm 212 is disposed at a side of the driving gear 211 while enabling a surface of the rotation arm 212 facing toward the driving gear 211 to be configured with a toothed portion 2120 capable meshed with the driving gear 211. Moreover, the rotation arm 212 further has a sliding trough 2122 formed on its extending arm 2121, and there is sliding block 2123 slidably fitted in the sliding trough 2122 that it is coupled to the sidewall of the sliding trough 2122 by an elastic member 2124 and thus is capable of moving reciprocatively by the elasticity of the elastic member 2124. In addition, the rotation arm 212 further has a ring-like protruding portion 2125 formed on a side thereof that is opposite to its toothed portion 2120, and further, there are two grooves 2126 formed on the ring-like protruding portion 2125.

Figure 4B:
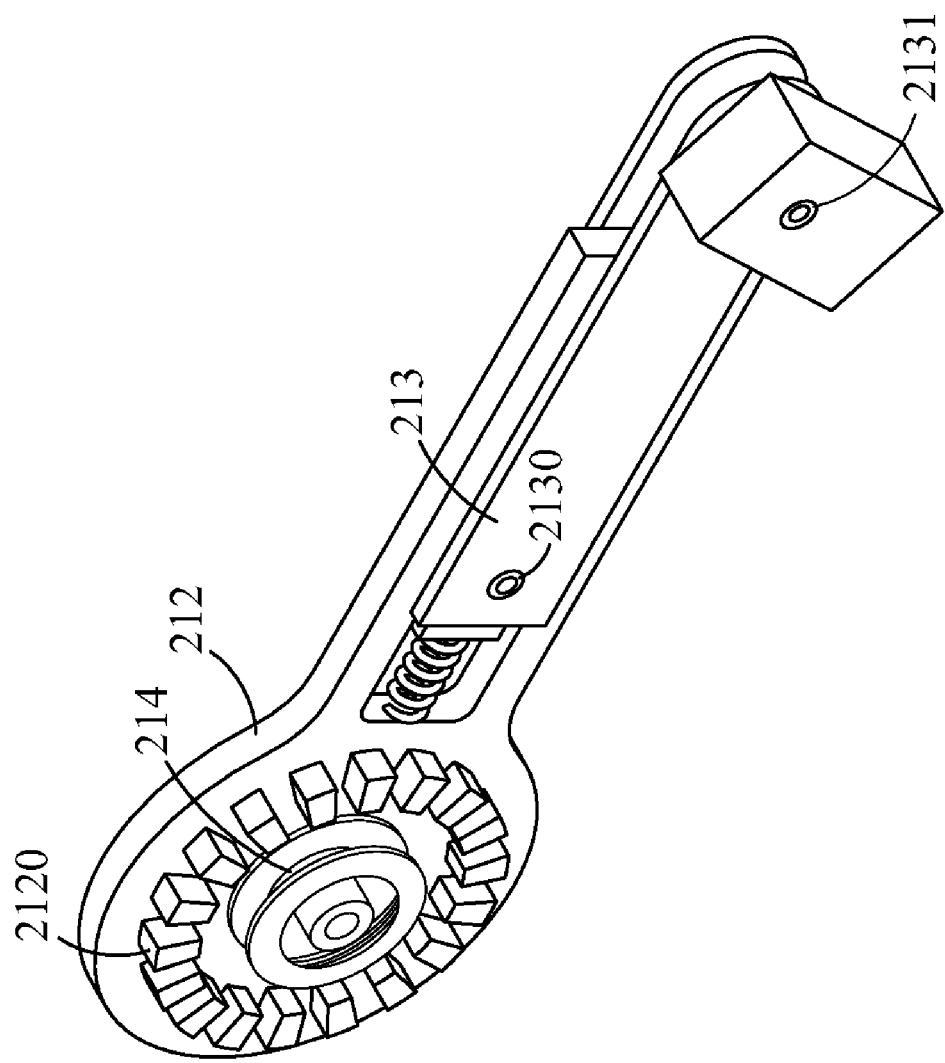
Figure 5:
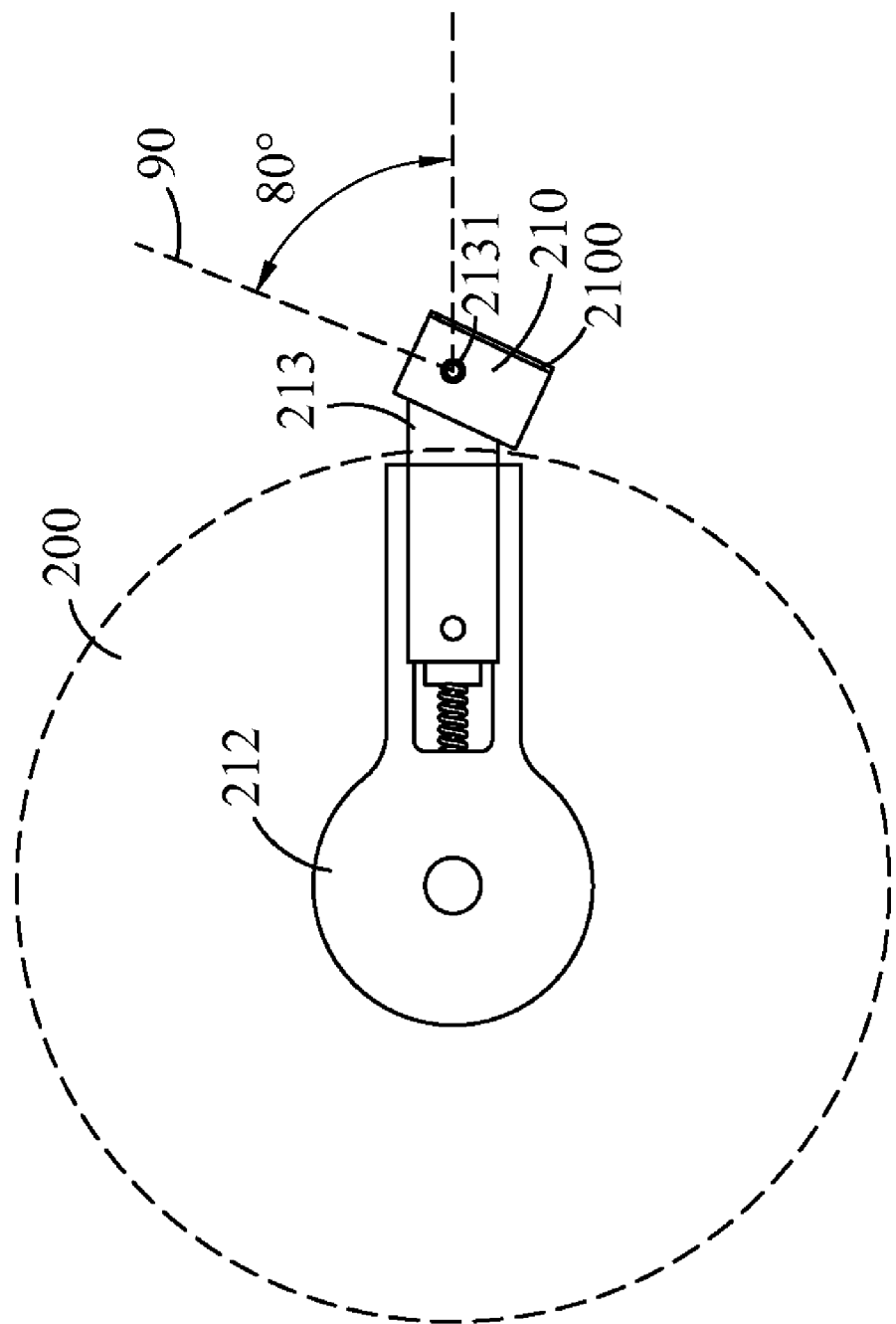
FIG. 5 is a schematic diagram showing how an assistant block is arranged in an assistant apparatus of the invention with respect to an included angle resulting from the arrangement.

As shown in FIG. 4B, the at least one rod 213 is pivotally coupled to the sliding block 2123. In this embodiment, there are two rods 213 that works as a pair for respectively coupled to the two sides of the sliding block 2123. It is noted that the amount of the rod 213 is dependent upon actual requirement. Although there is a pair of rods 213 used in this embodiment, they can be considered as a single rod structure. There is further an elastic torque element 2130 arranged at a joint where the sliding block 2123 is pivotally coupled to the pair of rods 213, by which the pair of rods 213 can return to its original position as soon as it is released from the affection of an external force. As shown in FIG. 5, the pair of rods 213 is pivotally coupled to the sliding block 2123 by its front end while forming an initial included angle of 80 degrees between its center line 90 and the horizontal axis. The design of such initial included angle is to enable the assistant block to lie flatly on the ground the minute when it touches the ground. In addition, there is further another elastic torque element 2131 arranged at a joint where the assistant block 210 is pivotally coupled to the pair of rods 213, by which the assistant block 210 can return to its original position as soon as it is released from the affection of an external force. It is noted that, for increasing the friction of the assistant block 210 to the ground, the assistant block 210 can be fitted with a friction layer 2100 at a surface thereof where is designed to have contact with the ground.

Figure 4C:
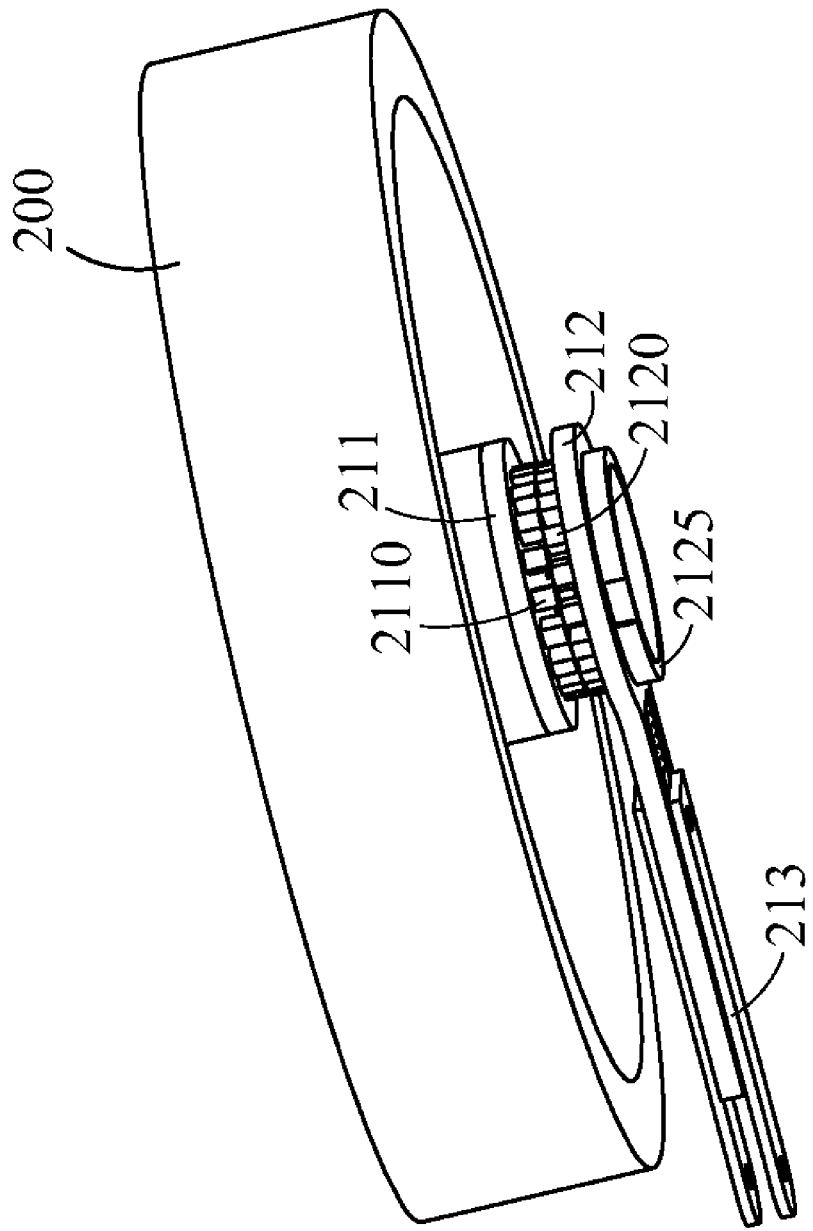
Figure 6A:
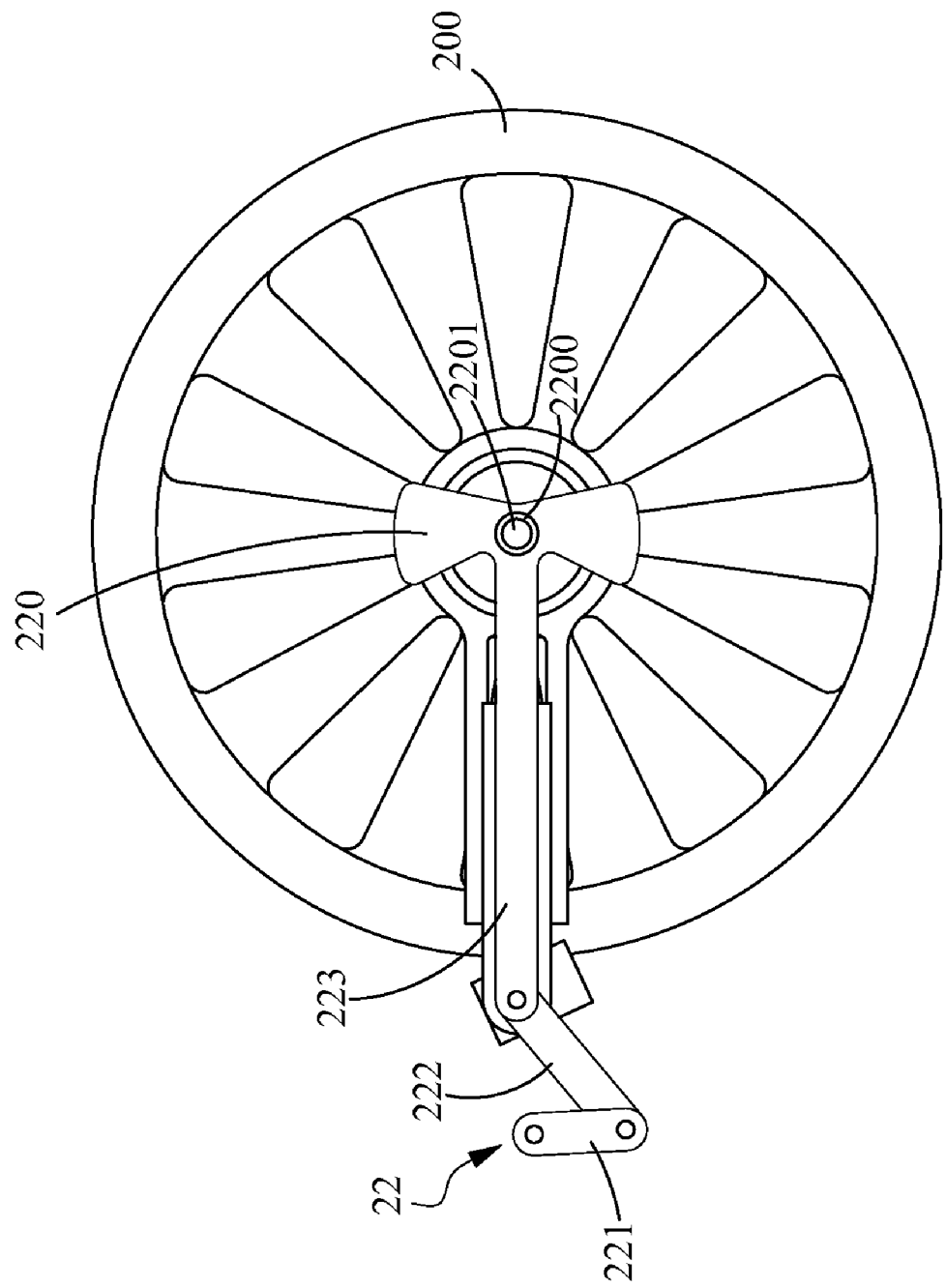
FIG. 6A is a side view of a sensing/driving apparatus used in an assistant apparatus of the invention.
Figure 6B:
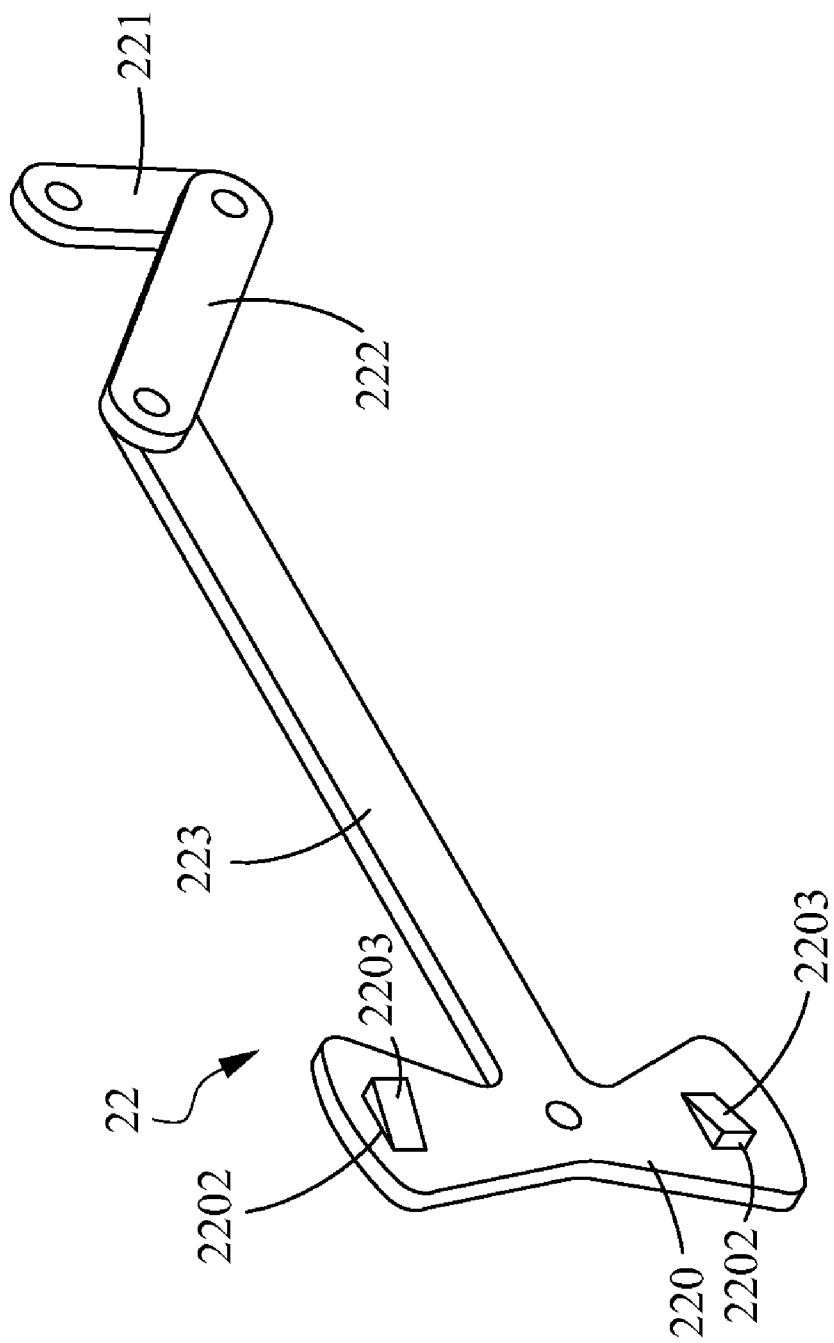
FIG. 6B is a schematic diagram showing how a sensing element, a driving entity and a plurality of transmission rods are connected in the present invention.

As shown in FIG. 4B, there is further an elastic element 214 being disposed at a position between the rotation arm 212 and the driving gear 211, by which the driving gear 211 and the rotation arm 212 are spaced by an interval L1 when the two are meshed together, as shown in FIG. 4C. In this embodiment, the elastic element 214 is a linear spring, but is not limited thereby. Please refer to FIG. 6A, which is a side view of a sensing/driving apparatus used in an assistant apparatus of the invention. The sensing/driving apparatus 22 comprises a driving entity 220 and a sensing element 221, in which the driving entity 220, being configured with at least a protrusion 2202 at positions corresponding to the at least one groove 2125 of the rotation arm 212 to be fitted therein, is being disposed at a side of the rotation arm 212 while being pivotally coupled to a fixing shaft 2201 by the use of an elastic torque element 2200. In this embodiment, there are two protrusions 2202 formed on the driving entity 220 in a manner that they are disposed respectively on the two opposite sides of the driving entity 220, as shown in FIG. 6B, whereas each of the two protrusions 2202 is formed with a ramp 2203. The sensing element 221 is coupled to the driving entity 220 by a plurality of inter-connected transmission rods, as the two transmission rods 222, 223 shown in FIG. 6B.

Figure 7A:
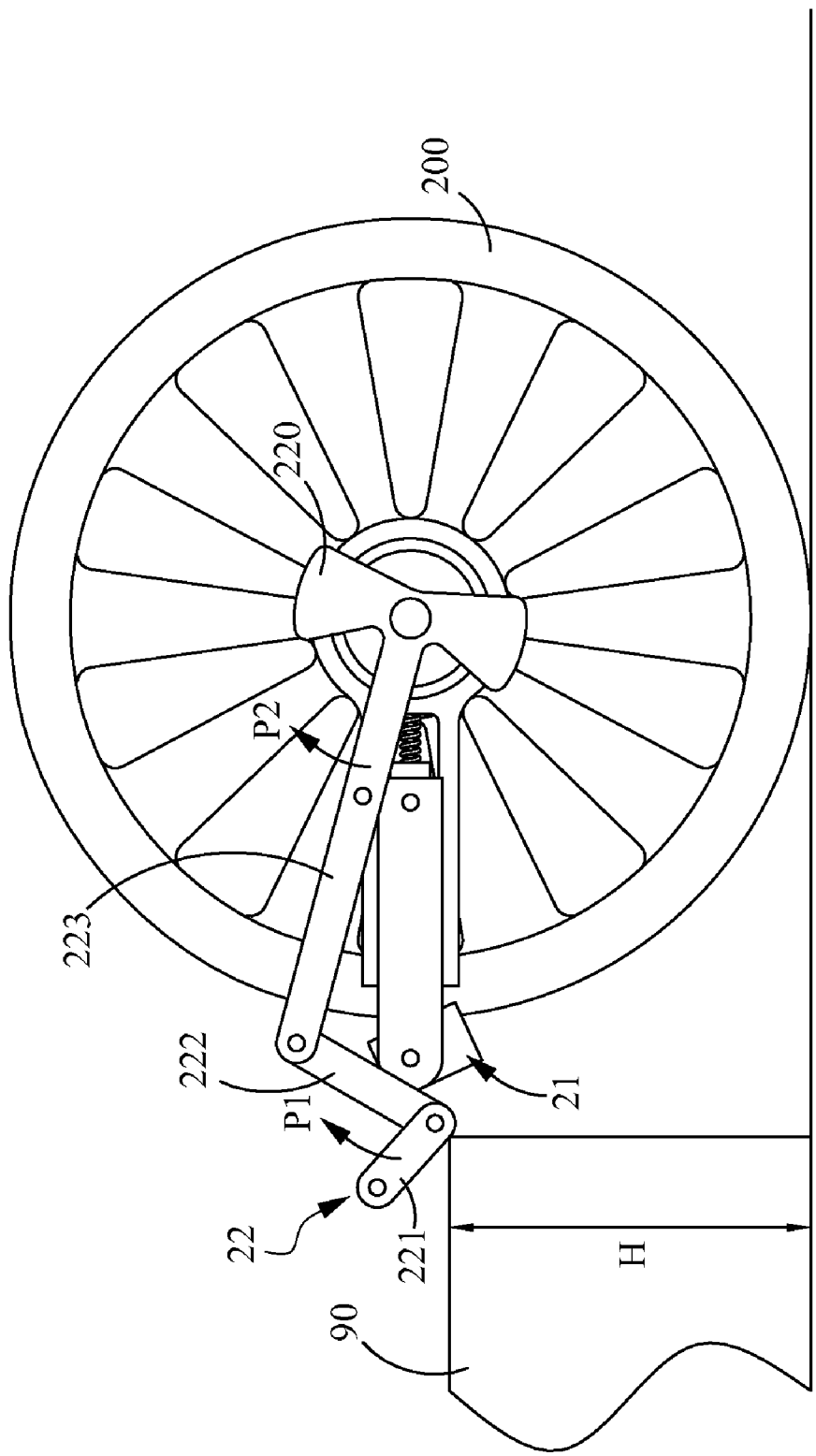
FIG. 7A is a schematic diagram showing a sensing/driving apparatus of the invention that is in contact with a barrier.
Figure 7B:
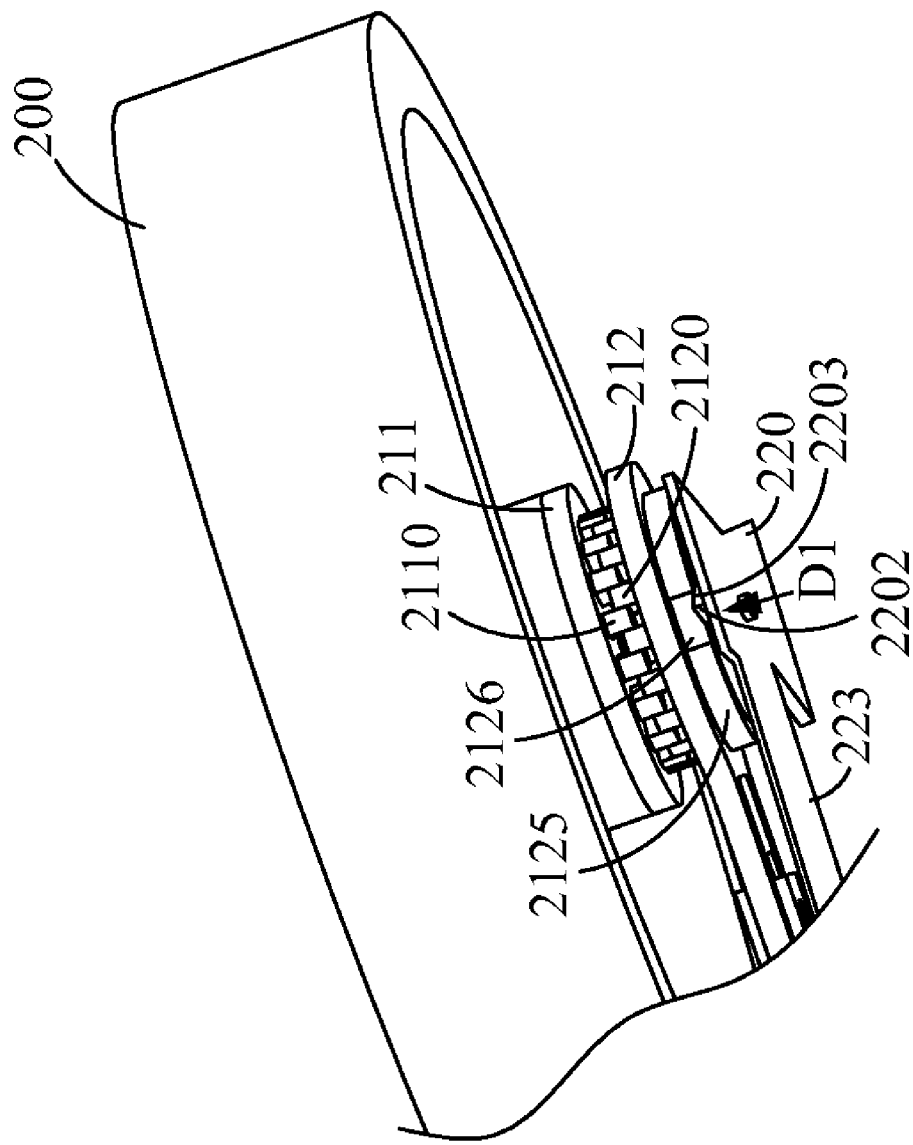
FIG. 7B is a schematic diagram showing how the toothed portion of the rotation arm is meshed with the driving gear in the present invention.

Please refer to FIG. 7A and FIG. 7B, which is a schematic diagram showing a sensing/driving apparatus of the invention that is in contact with a barrier, and a schematic diagram showing how the toothed portion of the rotation arm is meshed with the driving gear in the present invention. By the two aforesaid figures, the barrier surmounting movement assisting by the assistant apparatus of FIG. 1 is illustrated, whereas the barrier 90 to be surmounted in this embodiment is a step whose height H is too much for a drive wheel to step and cross over, and thus, the assistant mechanism as well as the sensing/driving apparatus in the assistant apparatus of the invention are activated for assisting the drive wheel to surmount the step 90. In FIG. 7A, when the drive wheel 200 is moving toward the barrier 90, eventually the sensing/driving apparatus 22 will touch the barrier 90, and then, the sensing element 221 of the sensing/driving apparatus 22 will be forced to rotate in the P1 direction since the drive wheel 200 is kept rotating and moving forward after touching with the barrier 90. When the sensing element 221 is forced to rotate in the P1 direction, the two transmission rods 222, 223 are brought along to rotate in the P2 direction, and as the two transmission rods 222, 223 are connected to the driving entity 220, the rotation movement of the two transmission rods 222, 223 will bring along the driving entity 220 to rotate as well. As shown in FIG. 7B, since the driving entity 220 is configured with two protrusions 2202 with ramps 2203, the rotation of the driving entity 220 will cause the protrusions 2202 to detach from their corresponding grooves 2126 by the slope of the ramps 2203 and then eventually abut against the ring-like protruding portion 2125, by that the rotation arm 212 is enabled to perform a movement in an axial direction D1 for mashing the toothed portion 2120 to the teeth 2110 of the driving gear 211 and thus cause the rotation arm 212 to be driven to rotate by the rotation of the drive wheel 200 transmitted by way of the driving gear 210.

Figure 8A:
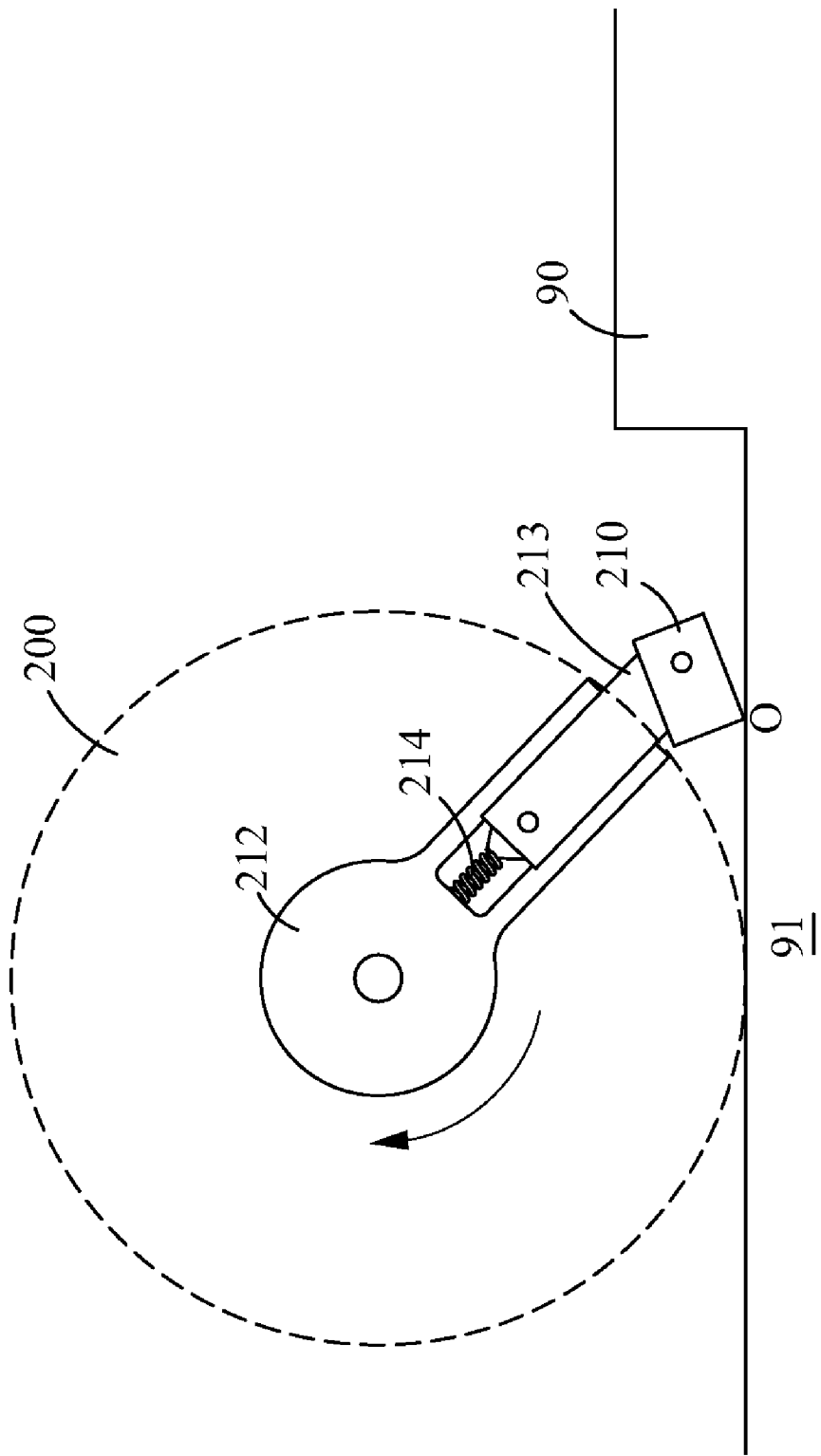
FIG. 8A to FIG. 8F are diagrams showing how an assistant apparatus of the invention is used for assisting a drive wheel to surmount a barrier.
Figure 8B:
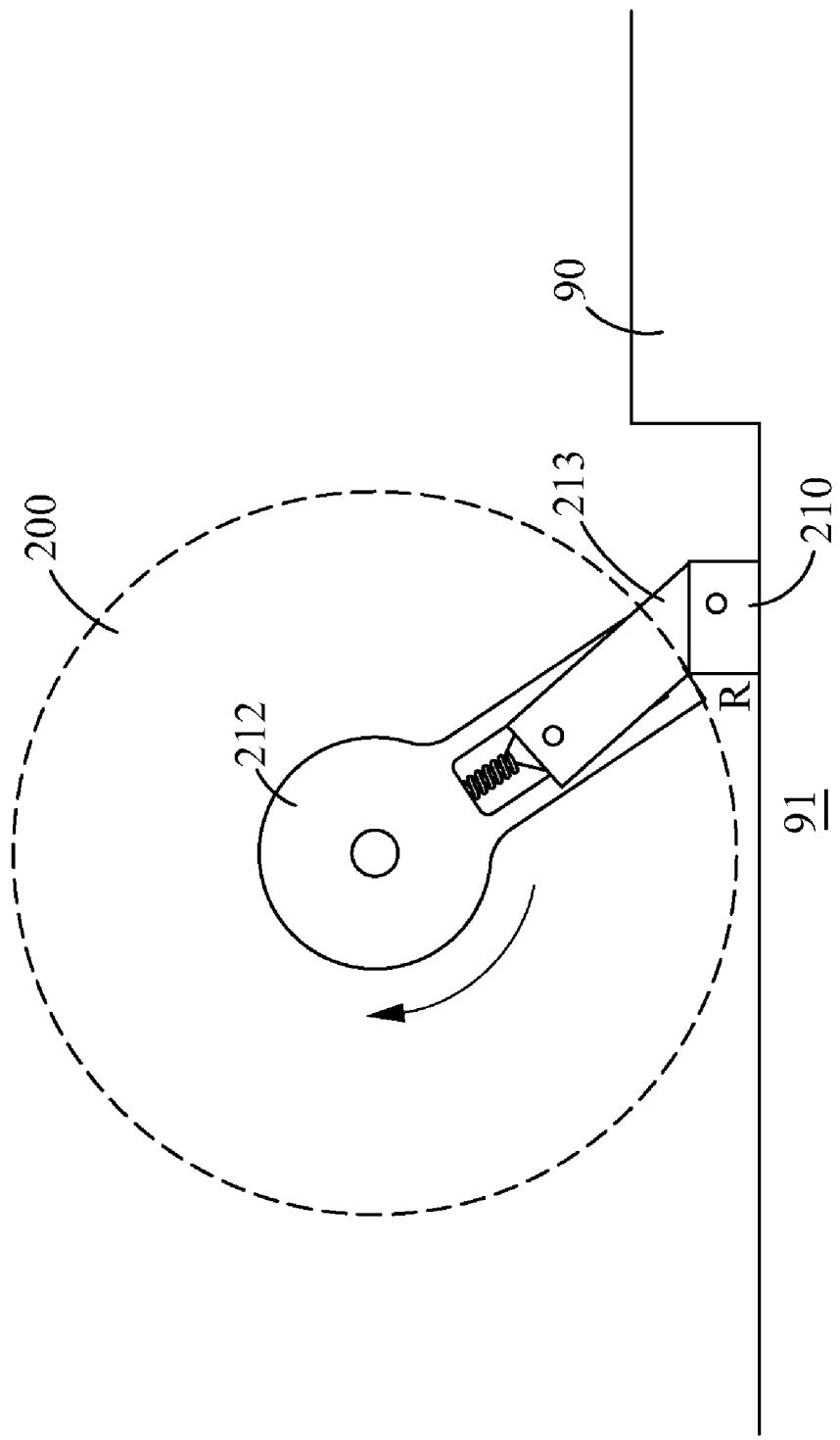

As the rotation arm 212 is driven to rotate by he rotation of the driving gear 211, the pair of rods 213 attached to the rotation arm 212 will be brought along to rotate as well for bringing the assistant block 210 attached to the front end of the pair of rods to move toward the ground, as shown in FIG. 7B. Please refer to FIG. 8A to FIG. 8F, which are diagrams showing how an assistant apparatus of the invention is used for assisting a drive wheel to surmount a barrier. In FIG. 8A, the rotating rotation arm 212 will bring the assistant block 210 to touch the ground 91 at point O, and the same time that since the assistant block 210 is coupled with the rod 213 by the elastic torque element 2131, the elastic torque element 2131 is twisted by the rotation of the rotation arm 212 and thus cause the assistant block 210 to lie flatly on the ground 91 by a side thereof, as that shown in FIG. 8B. When the assistant block 210 is lying flatly on the ground 91 as shown in FIG. 8B, it is just being placed at a position between the driving wheel 200 and the barrier 90, by that the height difference between the barrier 90 and each step required for the drive wheel 200 to surmount is reduced comparing with the original height difference between the barrier 90 and the drive wheel 200. Thus, when the drive wheel is continue to rotate and move forward, it will first encounter with the assistant block 210 and then step on top of the same, as that shown in FIG. 8C. Similarly, as soon as the drive wheel 200 steps on top of the assistant block 210, the elastic element 214 as well as the two elastic torque elements 2130, 2131 are then being compressed and twisted by the continuing rotation of the rotation arm 212 until the drive wheel 200 touches the barrier 90.

Figure 8C:
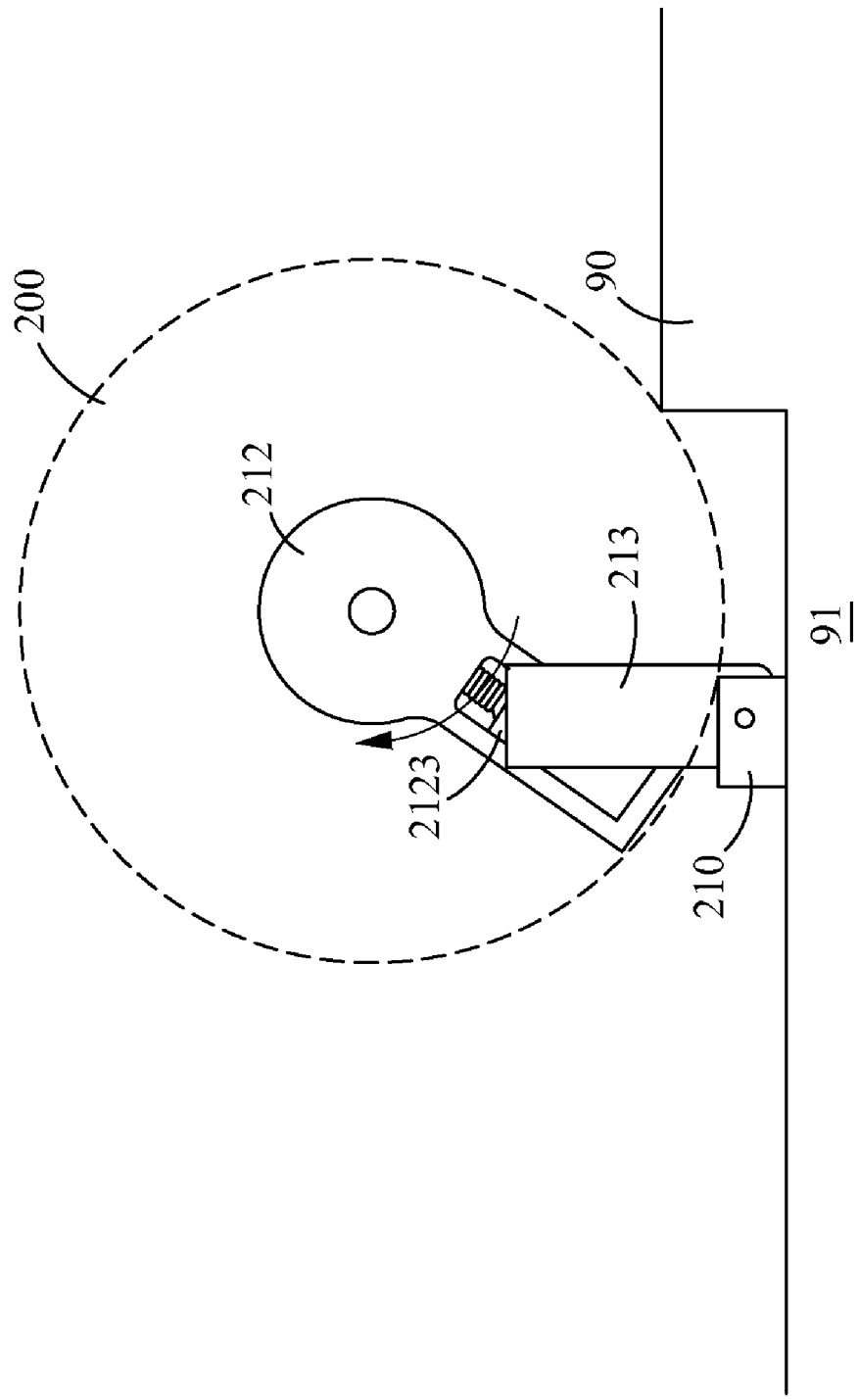
Figure 8D:
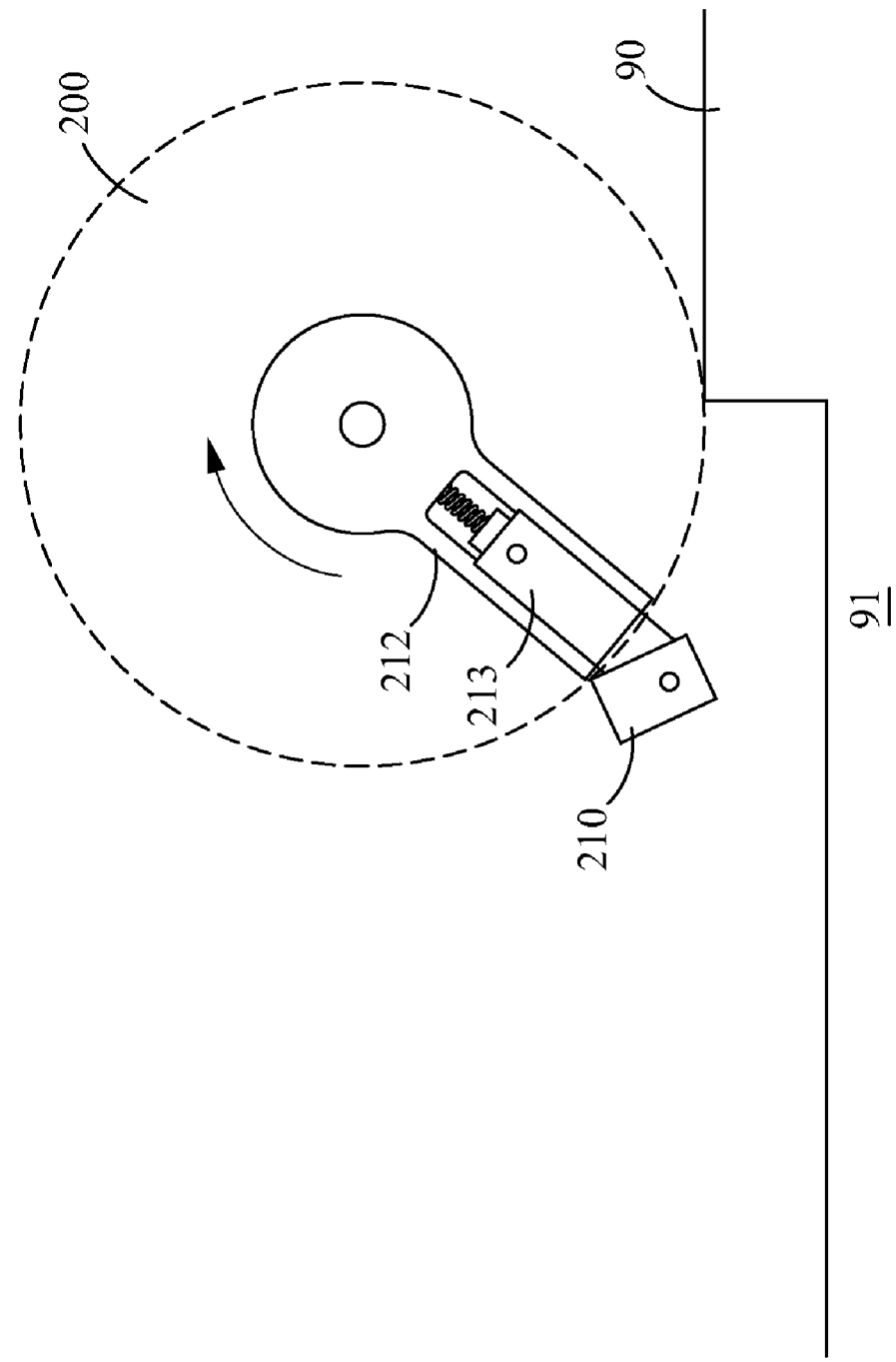
Figure 8E:
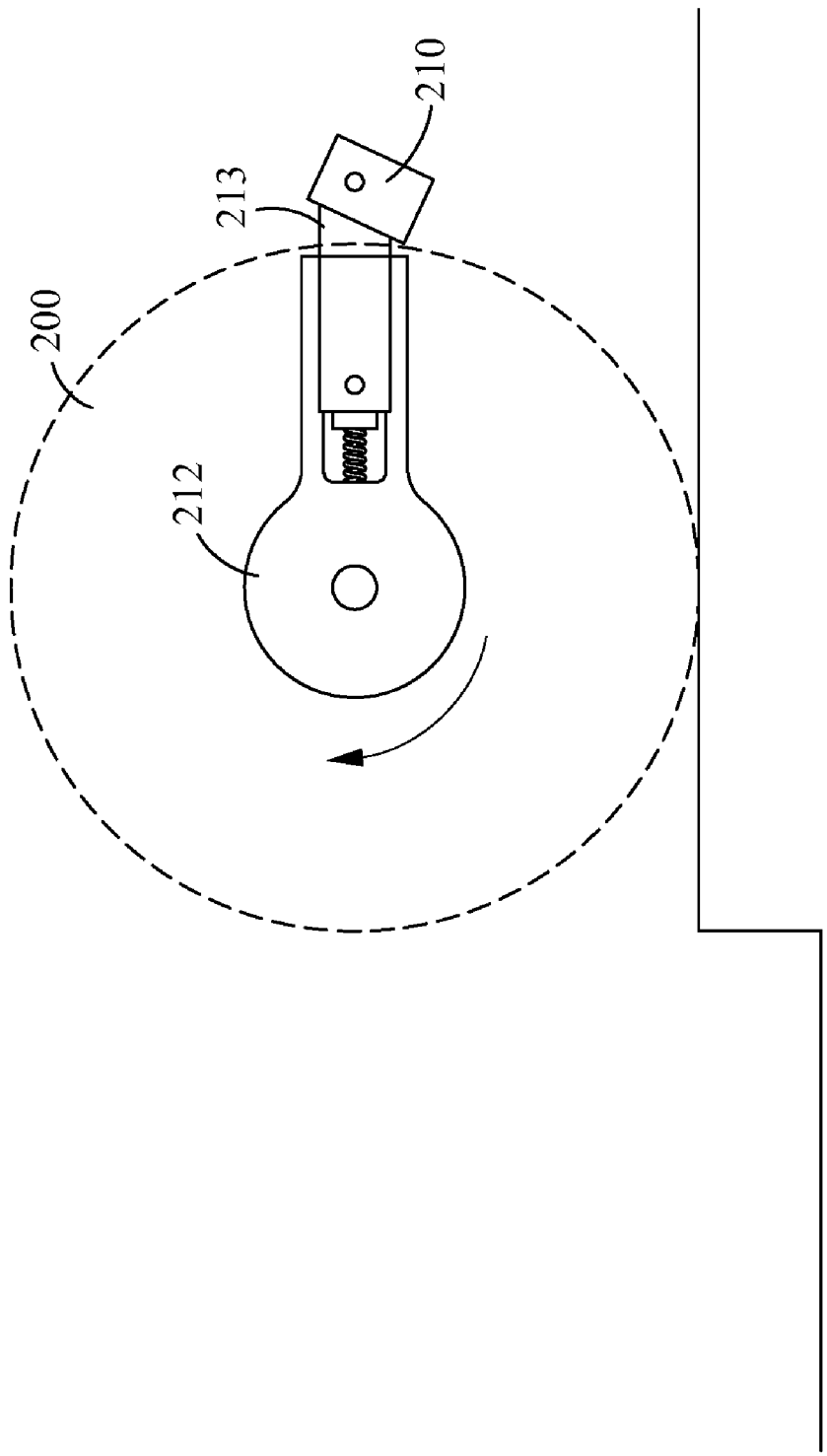
Figure 8F:
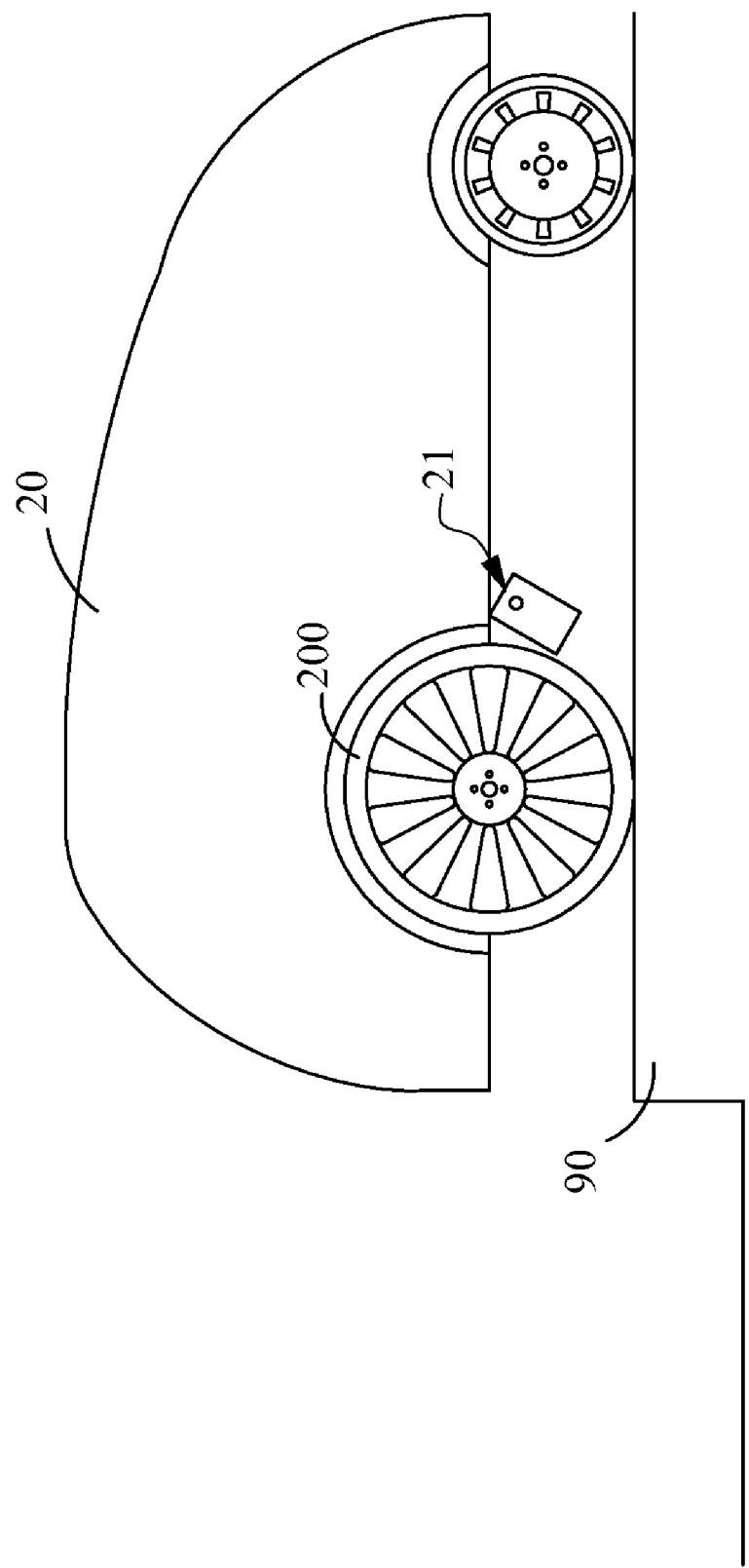

In FIG. 8D, after the drive wheel 200 is mounted on top of the barrier 90 by the buffering of the assistant block 210, the rolling of the drive wheel 200 will still bring the rotation arm 212 to rotate therewith as the rotation arm 212 is still meshed with the driving gear 211, and thereby, the rotation arm 212 being brought along to rotate is going to gradually bring the assistant to move away from contacting to the ground 91. With reference to FIG. 4A, FIG. 4b, FIG. 6A and FIG. 6B, when the drive wheel is situated in the status as shown in FIG. 8C, the sensing rods 213 are detached from contacting with the barrier 90, and thus the driving entity 220 that was brought along to rotate by the transmission rods 222, 223 will be sprung back to its initial position by the elastic torque element as it is free from the blocking of the barrier 90. Moreover, during the rotation of the rotation arm 212, the two protrusions 2202 formed on the driving entity 220 will eventually move to positions corresponding to the grooves 2126 formed on the rotation arm 212 and thus inset therein, by that the elastic element 214 sandwiched between the rotation arm 212 and the driving gear 211 are released from being compressed and thereby enables the driving gear 211 to detached from the toothed portion 2120 of the rotation arm 212, as that shown in FIG. 8E. With reference to the continuous movements shown in FIG. 8A to FIG. 8E, the assistant block 210, being designed to act as a stepping stone for assisting the drive wheel 200 to surmount the barrier 90, is first being placed in front of the barrier 90 at a position between the drive wheel 200 and the barrier 90 for facilitating the drive wheel 200 to surmount the barrier 90 as the height difference between the drive wheel 200 and each step required for the drive wheel 200 to surmount is reduced comparing with the original height difference between the barrier 90 and the drive wheel 200 so that it can easily step on top of the assistant block 210 before it climbs the barrier 90 and eventually surmount the barrier 90 as shown in FIG. 8F.

In the exemplary embodiment shown in FIG. 1, the sensing/driving apparatus uses the detection of mechanical sensing devices to drive the assistant mechanism to generate the adjusting movement. However, instead of the mechanical sensing devices, the sensing/driving apparatus can use electric sensor for the same purpose, as the embodiment shown in FIG. 9A and FIG. 9B. In this embodiment, the sensing/driving apparatus 23 includes a sensor 230, a driving entity 231, a controller 232, and a rotation driving unit 233. The sensor 230 is used for detecting the status of he barrier that generally includes information relating to the height of a detected barrier, the distance to the detected barrier and other signals capable of being used for determining whether there is a barrier in front of the drive wheel, and so on. The driving entity 231 is configured with at least a protrusion 2310 at positions corresponding to the at least one groove 2126 of the rotation arm 212 and is being disposed at a side of the rotation arm 212 while being pivotally coupled to a fixing shaft. It is noted that the driving entity 231 is structured similar to the aforesaid driving entity 220 and thus is not described further herein. The controller 232 is electrically connected to the sensor 230 for enabling the same to generate a control signal basing upon the detection of the sensor 230. In this embodiment, as the sensor 230 is designed to detect information of height and distance, the control signal relating to the detected distance is used as basis for determining whether or not it is time to activate the rotation of the rotation arm 212 while the control signal relating to the detected height is used as basis for controlling the output torque of the rotation driving unit 233. In addition, The rotation driving unit 233, being coupled to the driving entity 231 and electrically connected to the controller 232, is connected to the carrier body 20 by a brace 27, and is able to bring along the driving entity 231 to rotate according to the control signal, by that the at least one protrusion 2310 is detached from the at least one groove 2126 while enabling the same to abut against the rotation arm 212, and thus controls the rotation arm 212 to perform an axial movement for mashing the toothed portion 2120 to the driving gear 211 and thus causing the rotation arm 212 to be driven to rotate for placing the assistant block 210 at a position between the barrier 90 and the drive wheel 200. The mashing of the rotation arm 212 to the driving gear 210 by the activation of the driving entity 231 is the same as the aforesaid description and thus is not described further herein. In this embodiment, the rotation driving unit 233 can be a servo motor or other unit capable of providing rotation power. As for the operation of the assistant mechanism, it is similar to the aforesaid embodiment and thus is not described further herein. Moreover, the barrier surmounting movements of a drive wheel using the electric sensing/driving apparatus is similar to those shown in FIG. 8A to FIG. 8F.

Figure 9A:
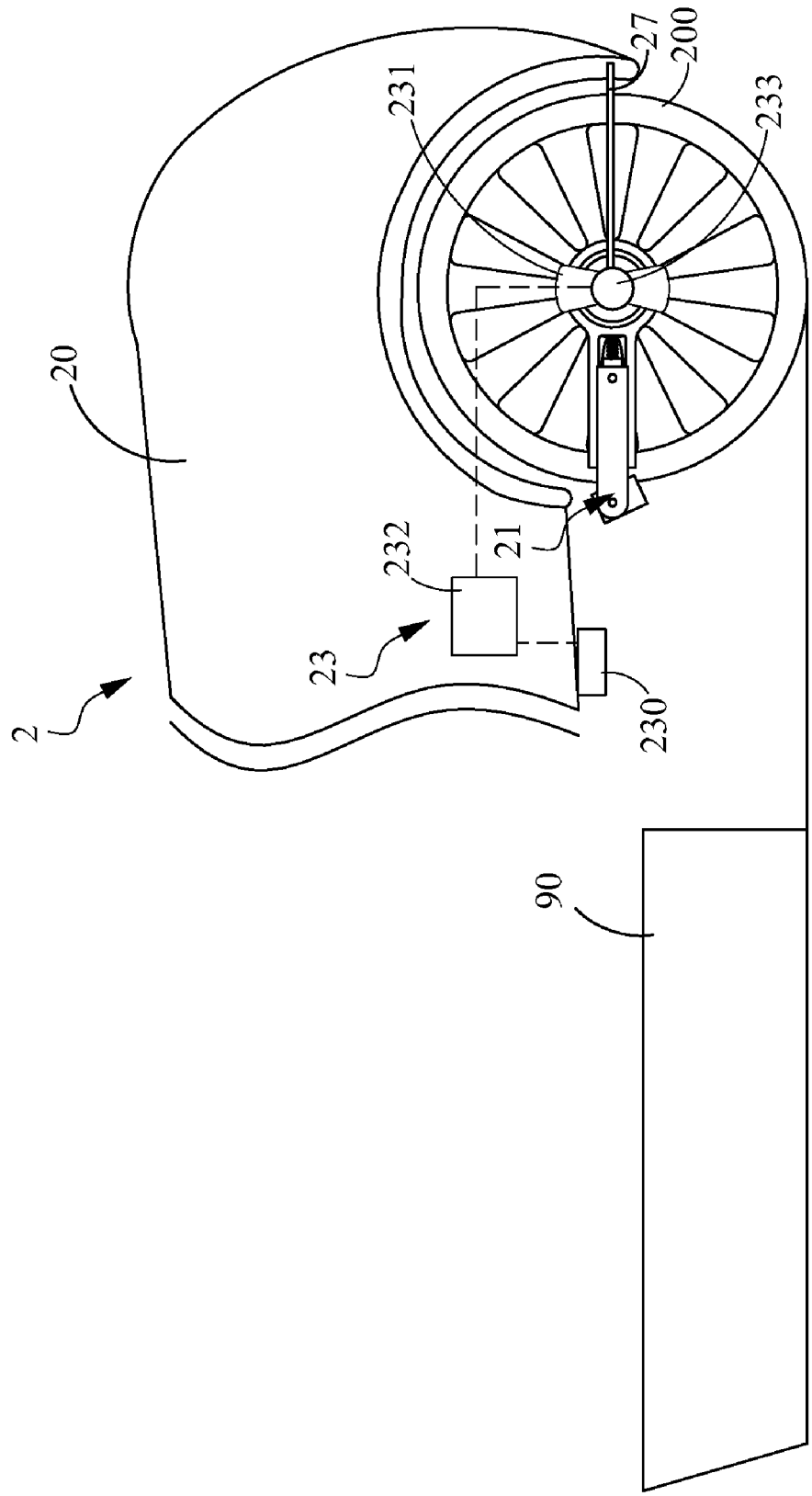
FIG. 9A and FIG. 9B show a sensing/driving apparatus according to another embodiment of the invention.
Figure 9B:
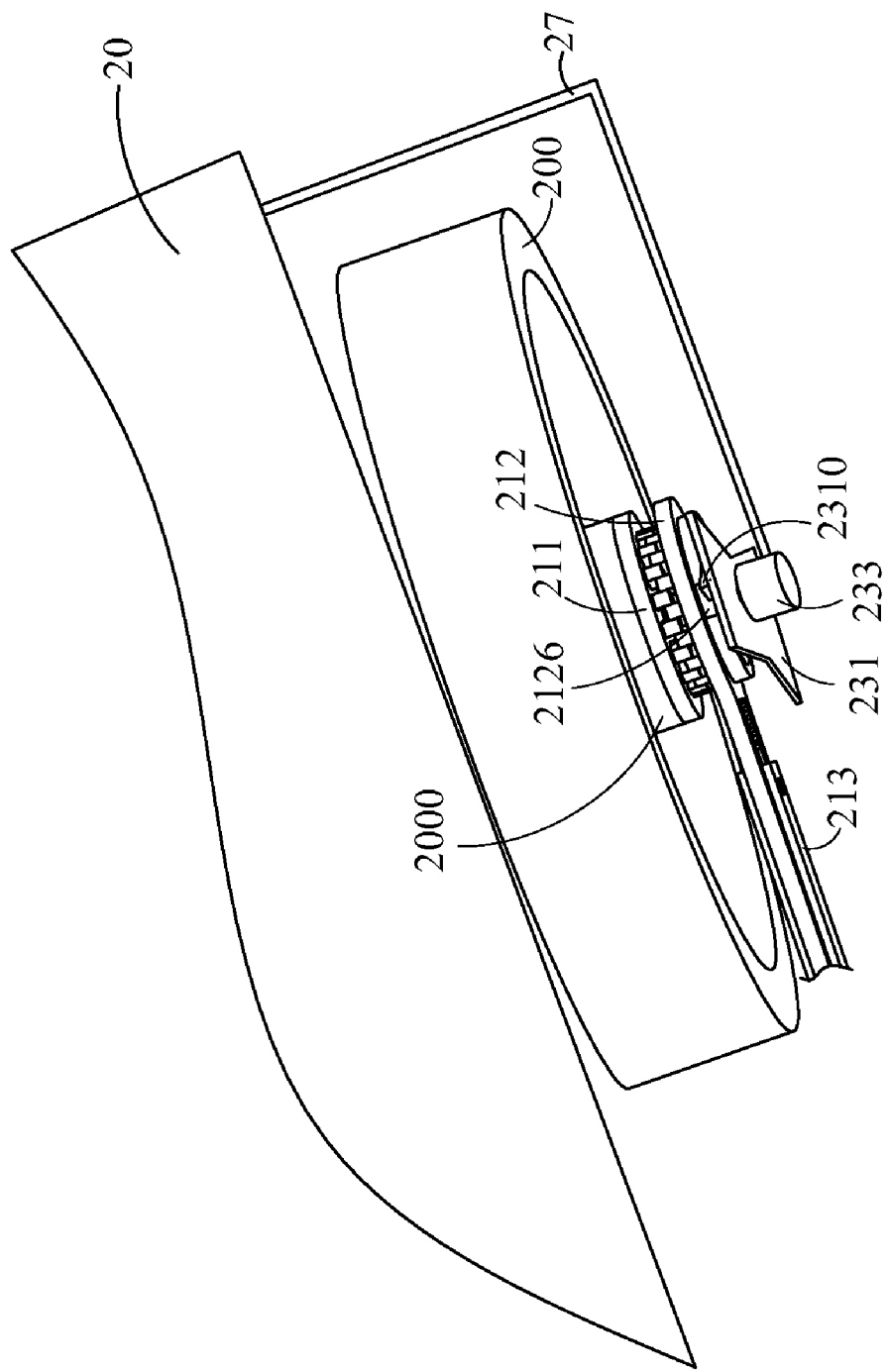
Figure 10:
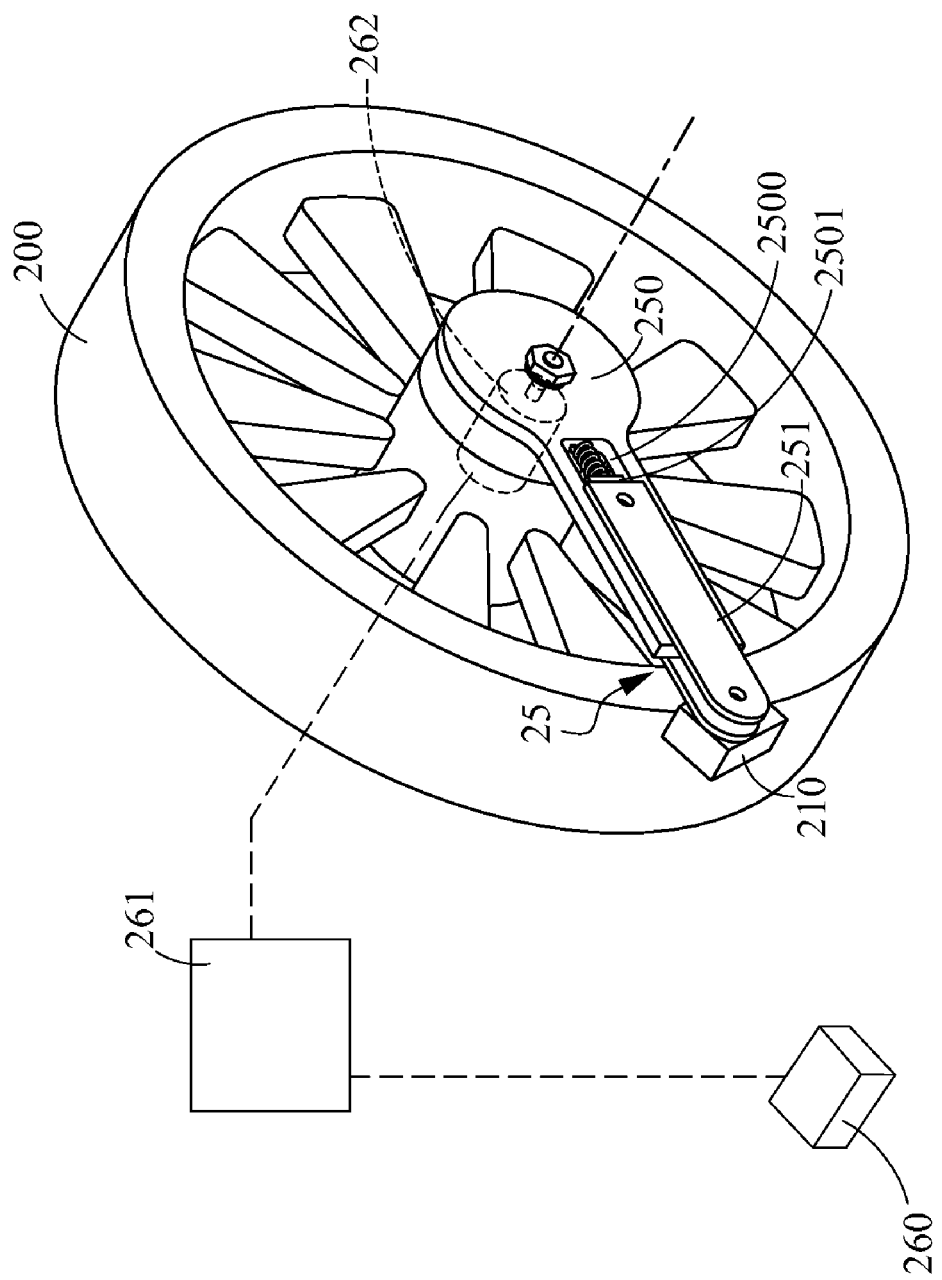
FIG. 10 shows an assistant apparatus for surmounting a barrier according to another embodiment of the invention.

In the embodiments shown in FIG. 1 and FIG. 9A, the rotation power of the assistant mechanism is mainly coming from the rotation of the drive wheel. However, it can be driven to rotate by other power source without the help of the drive wheel. Please refer to FIG. 10, which shows an assistant apparatus for surmounting a barrier according to another embodiment of the invention. As the assistant mechanism is driven by an external power source that is not driven to rotated by the drive wheel, it is not needed to be configured with a driving gear, as the one shown in FIG. 1. In FIG. 10, the assistant mechanism is comprised of: a rotation arm 250 and at least a rod 251, in which the rotation arm 250 is configured with a sliding through 2500 having a sliding block 2501 slidably fitted therein; and the at least one rod 251 is coupled to the sliding block 2501 by an end thereof. It is noted that both the rotation arm 250 and the rod 251 are configured the same as the aforesaid embodiments and thus are not described further herein. The aforesaid assistant mechanism 25 can also work with an electric sensing/driving apparatus 26 for assisting a drive wheel to surmount a barrier, in which the sensing/driving apparatus 26 further comprises: a sensor 260, a controller 261 and a rotation driving unit 262. The sensor 230 is used for detecting the status of he barrier that generally includes information relating to the height of a detected barrier, the distance to the detected barrier and other signals capable of being used for determining whether there is a barrier in front of the drive wheel, and so on. In this embodiment, the sensor 260 can be an infrared sensor, an ultrasonic sensor, or other sensor capable of detecting the existence of a barrier. The controller 261 is electrically connected to the sensor 260 for enabling the same to generate a control signal basing upon the detection of the sensor 230. In this embodiment, as the sensor 260 is designed to detect information of height and distance, the control signal relating to the detected distance is used as basis for determining whether or not it is time to activate the assistant mechanism 25 while the control signal relating to the detected height is used as basis for controlling the output torque of the rotation driving unit 262. The rotation driving unit 262, being coupled to the rotation arm 250 of the assistant mechanism 25 and electrically connected to the controller 261, can drive the rotation arm 250 to rotate according to the received control signal and thus place the assistant block between a barrier and a drive wheel.

When information of a barrier relating to its height and its distance to the drive wheel is detected by the sensor 260, the sensor 260 will generate a sensing signal to be received by the controller 261 where it is used in an evaluation for determining whether the drive wheel is capable of surmounting the barrier; and if the evaluation determines that the drive wheel will not be able to surmount the barrier, such determination will enable the controller 261 to generate a control signal to the rotation driving unit 262 for directing the same to drive the rotation arm 250 to rotate as soon as it receives the control signal. Thus, when the rotation arm 250 is rotating, the drive wheel can be assisted by the assistant mechanism 25 to surmount the barrier, whose movements are the same as those shown in FIG. 8A to FIG. 8F and this are not described further herein.

To sum up, the present invention provides an assistant apparatus capable of surmounting a barrier by the use of a comparatively less torque generated by a driving device of smaller horse power, and also it is a device adapted for assisting a carrier to surmount a barrier in a stable, comfort and safe manner.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An assistant apparatus for surmounting a barrier, comprising:
   a carrier body;
   an assistant mechanism, having an assistant block disposed at the end thereof while being disposed on the carrier body, capable of functioning to place the assistant block at a position between the carrier body and the barrier by the performing of an adjustment movement such that the barrier is sectioned by the assistant block and thus the carrier body steps on the assistant block and then on the barrier, wherein the assistant block is driven to return to an original position by the assistant mechanism as soon as the carrier body surmounts the barrier; and
   a sensing/driving apparatus, coupled to the assistant mechanism, capable of detecting the status of the barrier so as to use the detection as basis for determining whether or not to activate the assistant mechanism to perform the adjustment movement.

2. The assistant apparatus of claim 1, wherein the carrier body further comprises a drive wheel.

3. The assistant apparatus for surmounting a barrier, comprising:
   a carrier body, having a drive wheel;
   an assistant mechanism, having
   an assistant block disposed at the end thereof while being disposed on the carrier body, capable of functioning to place the assistant block at a position between the carrier body and the barrier by the performing of an adjustment movement;
   a driving gear, coupled to a wheel axle of the drive wheel;
   a rotation arm, being configured with at least a groove and a sliding trough with a sliding block slidably fitted therein, disposed at a side of the driving gear while enabling a surface of the rotation arm facing toward the driving gear to be configured with a toothed portion capable meshed with the driving gear;
   an elastic element, disposed at a position between the rotation arm and the driving gear; and
   at least a rod, each pivotally coupled to the sliding block while enabling an end thereof to be pivotally coupled to the assistant block; and
   a sensing/driving apparatus, coupled to the assistant mechanism, capable of detecting the status of the barrier so as to use the detection as basis for determining whether or not to activate the assistant mechanism to perform the adjustment movement.

4. The assistant apparatus of claim 3, wherein the sensing/driving apparatus further comprises:
   a driving entity, being configured with at least a protrusion at positions corresponding to the at least one groove of the rotation arm as it is being disposed at a side of the rotation arm while being pivotally coupled to a fixing shaft; and
   a sensing element, being connected to the driving entity by a plurality of inter-connected transmission rods;
   wherein, when the sensing element detects the barrier, the detection will force the plural transmission rods to bring along the driving entity to rotate, and the rotation will detaching the at least one protrusion from the at least one groove while enabling the same to abut against the rotation arm and thus controlling the rotation arm to perform an axial movement so as to mash the toothed portion to the driving gear and thus cause the rotation arm to be driven to rotate for placing the assistant block at a position between the barrier and the drive wheel.

5. The assistant apparatus of claim 3, wherein the sensing/driving apparatus further comprises:
   a sensor, for detecting the barrier;
   a driving entity, being configured with at least a protrusion at positions corresponding to the at least one groove of the rotation arm as it is being disposed at a side of the rotation arm while being pivotally coupled to a fixing shaft;
   a controller, electrically connected to the sensor for enabling the same to generate a control signal basing upon the detection of the sensor; and
   a rotation driving unit, coupled to the driving entity while electrically connecting to the controller;
   wherein, the rotation driving unit is able to bring along the driving entity to rotate according to the control signal, by that the at least one protrusion is detached from the at least one groove while enabling the same to abut against the rotation arm, and thus controls the rotation arm to perform an axial movement for mashing the toothed portion to the driving gear and thus causing the rotation arm to be driven to rotate for placing the assistant block at a position between the barrier and the drive wheel.

6. The assistant apparatus of claim 3, wherein there is further an elastic torque element arranged at a joint where the assistant block is pivotally coupled to the at least one rod.

7. The assistant apparatus of claim 3, wherein there is further an elastic torque element arranged at a joint where the sliding block is pivotally coupled to the at least one rod.

8. The assistant apparatus of claim 5, wherein the sensor is a device selected from the group consisting of: a distance sensor and an obstacle sensor.

9. The assistant apparatus for surmounting a barrier, comprising:
- a carrier body, having a drive wheel;
- an assistant mechanism, having
  - an assistant block disposed at the end thereof while being disposed on the carrier body, capable of functioning to place the assistant block at a position between the carrier body and the barrier by the performing of an adjustment movement;
  - a rotation arm, being configured with at least a groove and a sliding trough with a sliding block slidably fitted therein as it is disposed at a side of the drive wheel; and
  - at least a rod, pivotally coupled to the sliding block while having an end thereof coupled to the assistant block; and
- a sensing/driving apparatus, coupled to the assistant mechanism, capable of detecting the status of the barrier so as to use the detection as basis for determining whether or not to activate the assistant mechanism to perform the adjustment movement.

10. The assistant apparatus of claim 9, wherein the sensing/driving apparatus further comprises:
- a sensor, for detecting the barrier;
- a controller, electrically connected to the sensor for enabling the same to generate a control signal basing upon the detection of the sensor; and
- a rotation driving unit, coupled to a driving entity while electrically connecting to the controller;
- wherein, the rotation driving unit is able to bring along the rotation arm to rotate according to the control signal, and thereby, the assistant block is placed at a position between the barrier and the drive wheel.

11. The assistant apparatus of claim 10, wherein the sensor is a device selected from the group consisting of: a distance sensor and an obstacle sensor.

12. The assistant apparatus of claim 9, wherein there is further an elastic torque element arranged at a joint where the assistant block is pivotally coupled to the at least one rod.

13. The assistant apparatus of claim 9, wherein there is further an elastic torque element arranged at a joint where the sliding block is pivotally coupled to the at least one rod.

14. The assistant apparatus of claim 1, wherein the the assistant block is tilted towards a horizontal axis with a specific angle.

* * * * *